United States Patent
Wright et al.

(10) Patent No.: US 12,243,133 B2
(45) Date of Patent: Mar. 4, 2025

(54) METHOD AND SYSTEM FOR GENERATING IMAGES USING GENERATIVE ADVERSARIAL NETWORKS (GANS)

(71) Applicant: SHOPIFY INC., Ottawa (CA)

(72) Inventors: Asher Wright, Victoria (CA); Hettige Ray Perera Jayatunga, Toronto (CA)

(73) Assignee: SHOPIFY INC., Ottawa (CA)

( * ) Notice: Subject to any disclaimer, the term of this patent is extended or adjusted under 35 U.S.C. 154(b) by 430 days.

(21) Appl. No.: 17/734,938

(22) Filed: May 2, 2022

(65) Prior Publication Data

US 2023/0351654 A1    Nov. 2, 2023

(51) Int. Cl.
| | |
|---|---|
| *G06K 9/62* | (2022.01) |
| *G06Q 30/0601* | (2023.01) |
| *G06T 11/60* | (2006.01) |
| *G06V 10/764* | (2022.01) |
| *G06V 10/82* | (2022.01) |
| *G06V 10/774* | (2022.01) |

(52) U.S. Cl.
CPC .......... *G06T 11/60* (2013.01); *G06Q 30/0633* (2013.01); *G06Q 30/0643* (2013.01); *G06V 10/764* (2022.01); *G06V 10/82* (2022.01); *G06T 2200/24* (2013.01); *G06V 10/774* (2022.01)

(58) Field of Classification Search
CPC . G06T 11/60; G06T 2200/24; G06Q 30/0633; G06Q 30/0643; G06Q 30/0631; G06V 10/764; G06V 10/82; G06V 10/774
See application file for complete search history.

(56) References Cited

U.S. PATENT DOCUMENTS

| | | | |
|---|---|---|---|
| 10,262,236 B2* | 4/2019 | Lim | G06F 18/28 |
| 2021/0117773 A1* | 4/2021 | Sollami | G06N 3/084 |

FOREIGN PATENT DOCUMENTS

| | | | | |
|---|---|---|---|---|
| CN | 111627078 A | * | 9/2020 | G06F 16/51 |
| WO | WO-2022073414 A1 | * | 4/2022 | G06F 18/214 |

OTHER PUBLICATIONS

Alldieck, T., Zanfir, M., and Sminchisescu, C. 2022. "Photorealistic monocular 3F reconstruction of humans wearing clothing". Proceedings of the IEEE/CVF Conference on Computer Viion and Pattern Recognition (CVPR). url: https://phorhum.github.io/ (accessed May 2, 2022).

(Continued)

*Primary Examiner* — Xin Jia

(57) ABSTRACT

An image processing method and system that generates output images. The system receives a first input image depicting a first set of products and determines the first set of products and corresponding first product categories. The system then receives, on a user interface of a requestor device, a second input image depicting other products selected as being of interest having corresponding second product categories for the other products. In response to a match between one of the first product categories and the second product categories: the system applies the first input image and the second input image to generative adversarial networks (GANs). Each GAN is trained using image dataset for corresponding ones of the first and second product categories, to generate an output image replacing at least a portion of first input image with the second input image, the replacement based on the match between the product categories.

20 Claims, 7 Drawing Sheets

(56) References Cited

OTHER PUBLICATIONS

Ciu, A., McKee, D., and Lazebnik, S. 2021. "Dressing in order: recurrent person image generation for pose transfer, virtual try-on and outfit editing". url: https://arxiv.org/pdf/2104.07021v2.pdf (accessed May 2, 2022).

Colbert, C.M. "GAN fashion photo shoot: garment to model images using conditional GANs". 2018. GPU Technology Confernce. url: https://on-demand.gputechconf.com/gtc/2018/presentation/s8776-gan-fashion-photo-shoot-garment-to-model-images-using-conditional-gans.pdf (accessed May 2, 2022).

* cited by examiner

METHOD AND SYSTEM FOR GENERATING IMAGES USING GENERATIVE ADVERSARIAL NETWORKS (GANS)

FIELD

The present application relates to systems and methods for automated generation of images using generative adversarial networks (GANs) and more particularly, to generating the images in real-time using object detection.

BACKGROUND

Graphical user interfaces (GUI) for applications enable users of the computing devices to interact with such applications including browse online content such as electronic commerce (e-commerce) websites and to receive digital content from the e-commerce websites as well as provide input, for example to invoke an action on the GUI which can result in online transaction processing or other online data exchange relating to selected content from the e-commerce site.

Developers may utilize image processing systems to capture images from cameras, scanners or other computers and then manually utilize image editing applications to manually analyze and manipulate the captured images to desired content. Existing systems lack the ability to allow real-time generation of visually realistic digitally-generated (or synthetic) images for display on websites from combining two or more images. In one example, such realistic images may be defined as digital images which are visually indistinguishable from real photographs by at least one of a computer model or a human being (e.g. at least to an extent). In another example, realistic images are those which may have qualitative visual factors or perceptual criteria such as image background, lighting, object position, object shape and features, motion blur, image noise, etc. which are indistinguishable from photographs (e.g. either by a human viewer or a computer).

SUMMARY

In the context of online shopping and interactions with an online merchant, it is difficult for an online customer navigating a particular e-commerce website to gauge how multiple disparate items of interest offered by the merchant such as clothing would visually appear when worn together on a realistic image of a person.

For example, on an e-commerce website, the product web page for a particular item such as a white laced top may include images of a model wearing the top. However, the online customer browsing such e-commerce website may want to buy a different pair of jeans other than the one the model is wearing in that same image on the website. For example, the customer may already have a pair of blue jeans in their online shopping cart that they would like to visualize with the selected item, white laced top.

Currently there is no seamless way to generate images combining other image features in a visually realistic manner. In the e-commerce context, there is no way for an e-commerce web visitor to combine items of clothing from disparate product images into a single image in a cohesive way that is realistic and minimizes manual input. For example, some e-commerce merchants may currently manually capture photos of multiple combinations of products offered but to do so for all combinations is infeasible and time-consuming. Alternatively, given the large data set size of products offered by e-commerce websites, it is not feasible for manual manipulations of images to achieve desired results and even such manual manipulations would appear unrealistic and therefore unusable. Thus, existing methods of combining multiple images are inefficient, unrealistic and thereby unappealing to an online customer, which results in lack of engagement with the e-commerce website.

It would be desirable to have a system as may address at least some of the shortcomings of the above-noted systems such as to allow generating visually realistic output images.

In at least some implementations, there is provided computer-implemented systems and methods for automated and dynamic generation of images with improved efficiency, and accuracy (e.g. in real-time) using optimally trained machine learning (ML) model trained such as a generative adversarial network to combine objects based on browsing activity from different images containing products of interest to generate a new image containing a combination of the products of interest which appears as an output that is visually realistic. The ML model may be trained based on different categories of object/product types that may be of interest in order to generate realistic images based on new unseen data once trained.

A system of one or more computers can be configured to perform particular operations or actions by virtue of having software, firmware, hardware, or a combination of software, firmware, and hardware installed on the system that in operation causes or cause the system to perform the actions. One or more computer programs can be configured to perform particular operations or actions by virtue of including instructions that, when executed by data processing apparatus, cause the apparatus to perform the actions.

In at least some implementations, there is provided a computer implemented method comprising: receiving a first input image depicting a first set of products; determining from the first input image, the first set of products and corresponding first product categories; receiving, via a user interface of a requestor device, a second input image depicting other products having corresponding second product categories, the second input image selected as being of interest; and, matching the first product categories with the second product categories and using one or more generative adversarial networks (GANs) to generate an output image based on one of the first product categories matching the second product categories, the generating including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

In one aspect, the method further comprises: providing a classifier for determining based on the first input image, the first set of products and for determining the second product categories for the other products.

In one aspect, the classifier was trained based on a dataset of images to detect product categories.

In one aspect, the first input image comprises the first set of products depicted in use on at least one of an object or a person.

In one aspect, the method further comprises detecting profile data for a user of the requestor device selecting products of interest; accessing a database of mapping of the profile data to a set of visual attributes for the user; and, modifying the person depicted in the first input image based on the set of visual attributes.

In one aspect, the first input image is first generated by a generative adversarial network (GAN).

In one aspect, generating of the first input image and the generating of the output image are performed by a same generative adversarial network.

In one aspect, the first or the second input image is selected and received in response to interactions with an e-commerce website, the interactions comprising one or more of: browsing an e-commerce product on the e-commerce website; selecting an e-commerce product on the e-commerce website for detailed viewing; or adding an e-commerce product to an electronic cart of the e-commerce website.

In one aspect, the second input image is further selected based on a recommender model detecting a browsing history of the interactions on the e-commerce website, the browsing history used by the recommender model to detect additional products of interest based on the recommender model being trained on other browsing history for a set of requestor devices associated with the additional products of interest.

In one aspect, the classifier was trained on the dataset of images comprising image features associated with each of the images; one or more labelled product categories displayed in therein; and a boundary box visually defined around each of the labelled product categories in each image.

In one aspect, the classifier is a convolutional neural network classifier.

In one aspect, the first and second input images depict one or more e-commerce products, the e-commerce products comprising articles of clothing.

In one aspect, the GANs are trained, using the second image dataset comprises images showing at least one of: person images or product images showing at least e-commerce products.

In one aspect, the method further comprises providing a machine learning model trained using historical product and person image data of actual products and persons, the machine learning model receiving as input the output image and classifying the output image as realistic or not based on the output image of the model exceeding a defined confidence score.

In one aspect, the method further comprises: determining a priority generation value for the first product categories and the second product categories, and wherein generating the output image replacing said portion of the first input image with the second input image, the replacement occurring only when the priority generation value of corresponding second product categories exceeds the first product categories.

In one aspect, the GANs are configured to replace the portion of the first input image with the second input image, only when a resulting combination of products in a potential output image satisfies a matching trigger.

In one aspect, a computer readable medium having instructions tangibly stored thereon configured for generating output images, wherein the instructions, when executed cause a system to: receive a first input image depicting a first set of products; determine from the first input image, the first set of products and corresponding first product categories; receive, via a user interface of a requestor device, a second input image depicting other products having corresponding second product categories, the second input image selected as being of interest; and, match the first product categories with the second product categories and using one or more generative adversarial networks (GANs) to generate an output image based on one of the first product categories matching the second product categories, the generation including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

In one aspect, a computer system for generating output images, the computer system comprising: a processor in communication with a storage, the processor configured to execute instructions stored on the storage to cause the system to: receive a first input image depicting a first set of products; determine from the first input image, the first set of products and corresponding first product categories; receive, via a user interface of a requestor device, a second input image depicting other products having corresponding second product categories, the second input image selected as being of interest; and, match the first product categories with the second product categories and using one or more generative adversarial networks (GANs) to generate an output image based on one of the first product categories matching the second product categories, the generation including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

Implementations of the described techniques may include hardware, a method or process, or computer software on a computer-accessible medium.

BRIEF DESCRIPTION OF THE DRAWINGS

Embodiments will be described, by way of example only, with reference to the accompanying figures wherein.

DETAILED DESCRIPTION

Figure 1:
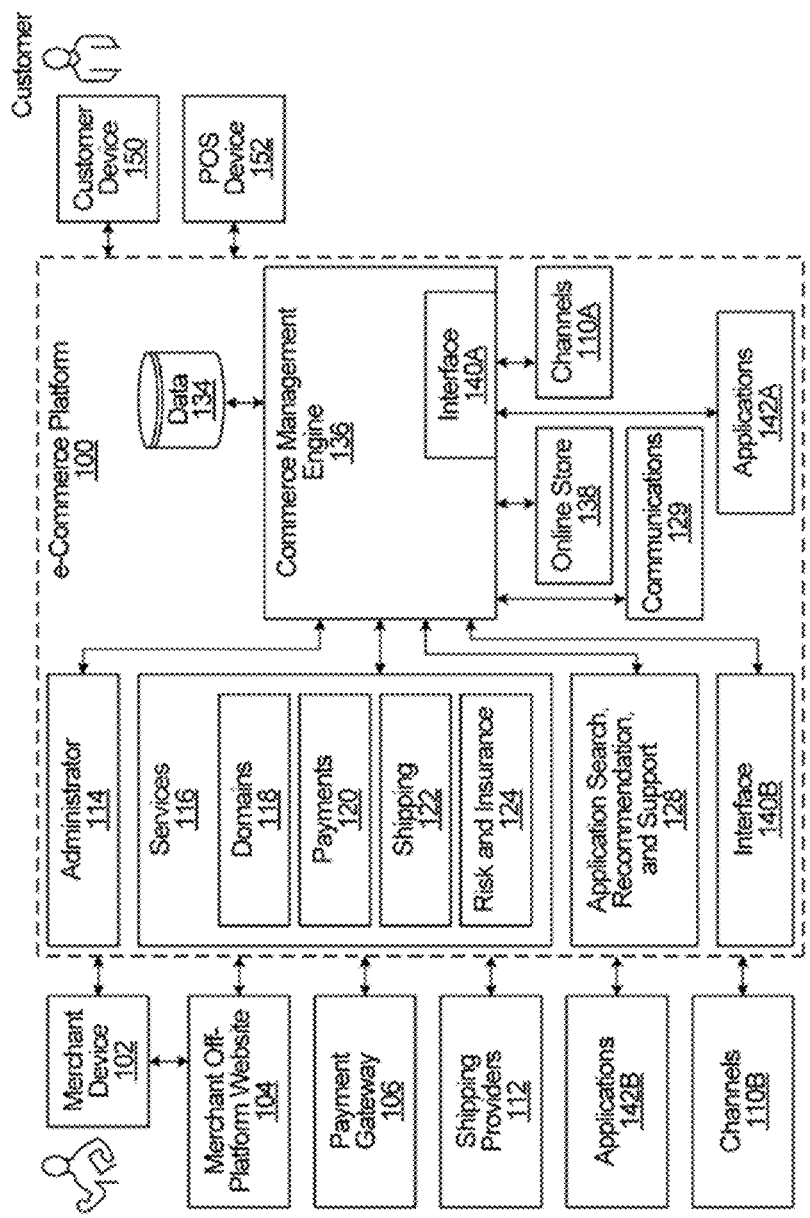
FIG. 1 is a block diagram of an e-commerce platform, according to one embodiment.

One or more currently preferred embodiments have been described by way of example. It will be apparent to persons skilled in the art that a number of variations and modifications can be made without departing from the scope of the invention as defined in the claims.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Note that the expression "at least one of A or B", as used in the present disclosure, is interchangeable with the expression "A and/or B". It refers to a list in which one may select A or B or both A and B. Similarly, "at least one of A, B, or C", as used herein, is interchangeable with "A and/or B and/or C" or "A, B, and/or C". It refers to a list in which one may select: A or B or C, or both A and B, or both A and C, or both B and C, or all of A, B and C. The same principle applies for longer lists having the same format.

Overview

Generally, capturing a large set of actual photographs from scratch (e.g. by a photographer using a digital camera or other capturing device) such as to depict various desired views of products and persons, and combination "looks" of products such as for use on an e-commerce site selling such products may be unfeasible, time-consuming and require excessive manual resources, skill and practice in order to capture the desired images. The generation of images using generative adversarial networks (GANs) can drastically reduce the user time and effort in manually capturing images by allowing automatic generation of novel imagery which can replace or at least reduce the need for users capturing an extensive set of images. GANs can effectively generate large sets of synthetic or computer generated images looking realistic to users as if they were real photographs (e.g. realistic images). However, it is difficult to direct the image output using GAN implementations if specific output images, such as composite images comprising more than one input image, are desired.

Typically, GANs are trained on large training datasets, and implemented to generate output images based on the training images used.

However, in these implementations, the output image may comprise an inferred image based on a generic image generated from the GAN in combination with an input image. It is desirable in circumstances to generate an output image comprising an inferred image from multiple input images, using GANs. For example, images used for marketing e-commerce products such as clothing are costly, tedious and time consuming to produce via actual photography (e.g. real photos), particularly given the number of possible combinations of products that may be required to be displayed in an image simultaneously. In the context of generating images for e-commerce products, it is desirable to have both the model for the item, and the e-commerce item such as an article of clothing, be used as input images, with the generated output image(s) comprising conditions or features of the input images.

There is a need for the automated generation of images, whereby an input image (e.g. a product image of a model wearing a number of products) is at least partially replaced with portions from other input product images (e.g. items in a customer's online cart) using generative adversarial networks.

In at least some disclosed embodiments, there is provided a computer method and system that generates images automatically using one or more GANs based on one or more input images, whereby the generated output image(s) comprise visual aspects/features of the one or more input images integrated or combined in a manner that is realistic. As will be described, separate features or components of each input image may first be encoded, e.g. face, pose, skin, garments, product(s) displayed, etc. and the encoded image portions used in cooperation with the GANs to generate an output image which combines in a realistic manner, features and/or components from various input images, as will be described herein. In some implementations, each of the GANs is trained independently to understand and recognize a set of particular product category types (e.g. expected from the images) such as apparel tops, bottoms, accessories, etc.

In at least some embodiments, one or more GANs are trained on training images for the output of realistic person images and product images. One or more input images are received by one or more trained GANs, which output realistic output images comprising features of the images (e.g. the features may include objects or persons in the images and their associated visual characteristics) from the one or more input images. Notably, as will be described the output image is generated in an intelligent and dynamic manner which incorporates features from specific regions in the input image(s) depending on determining which features in the input image(s) are of interest to the user. For example, in an e-commerce application, input image(s) containing products of interest to the user, may be combined and overlaid on another input image of interest that does not replace the products of interest (e.g. such products either predefined or dynamically determined via the disclosed systems) in a way to generate a realistic or plausible digital image using the benefits of the generative adversarial network (GAN).

In at least some implementations, the one or more GANs are a type of neural network and configured to generate new images as realistic examples (e.g. photorealistic images of objects, scenes or people which do not appear to be fake to the human eye or an image detection model). As will be described with reference to FIG. 4, each GAN may include two sub-models, a generator model trained to generate new output images and a discriminator model which attempts to classify the generator output images as real or fake (e.g. generated). The input provided to the GAN may be described herein as being "fed" or "input" or "taken in", or other such terminology as will be envisaged by a skilled person. For example, the GAN may "take in" a vector of variables representing an image, e.g. a reference or training image, in order to generate the output images as described herein, in at least some embodiments.

An Example e-Commerce Platform

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off-platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
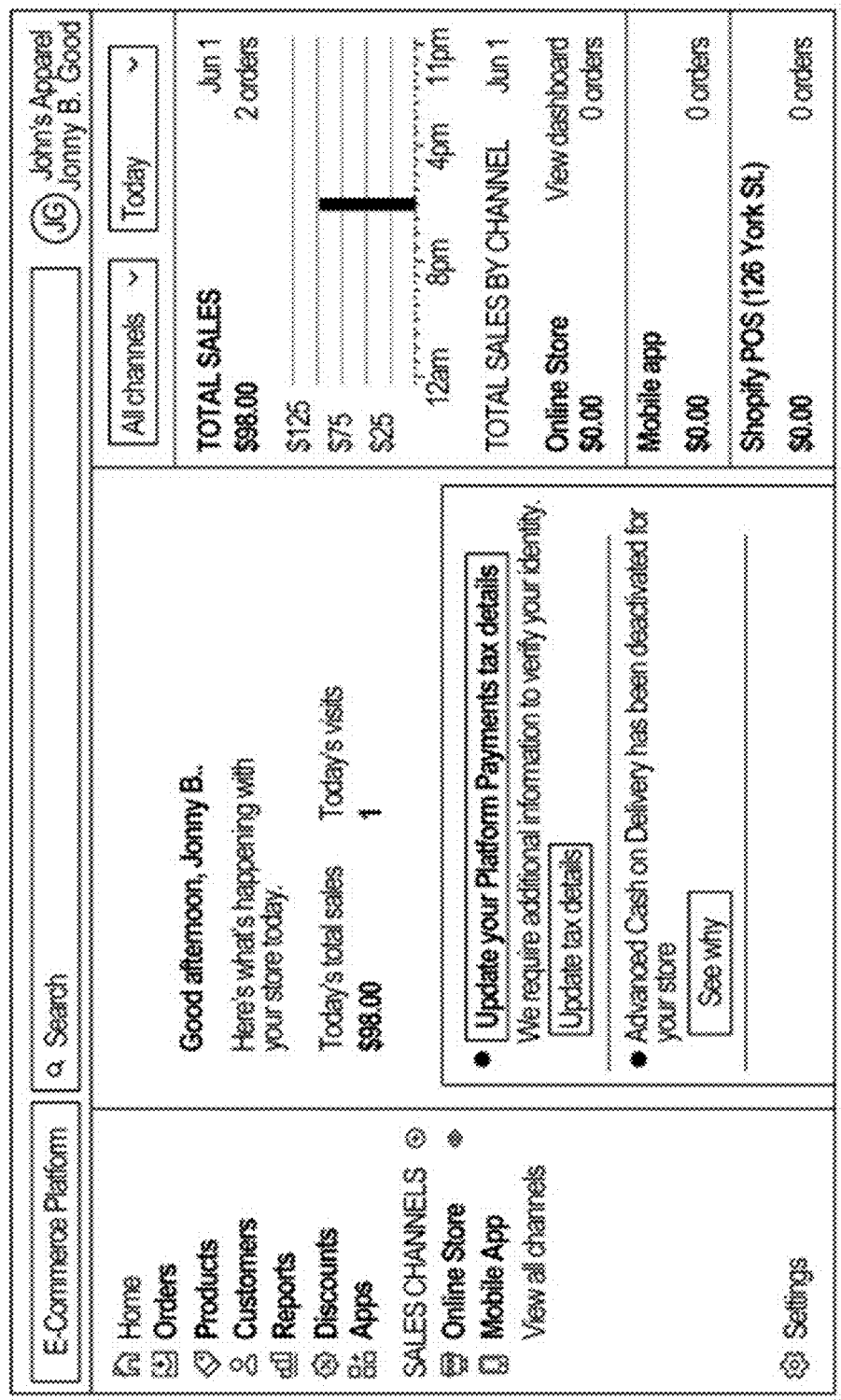
FIG. 2 is an example of a home page of an administrator, according to one embodiment.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Engine 300—Image Generation Using Machine Learning

Figure 3:
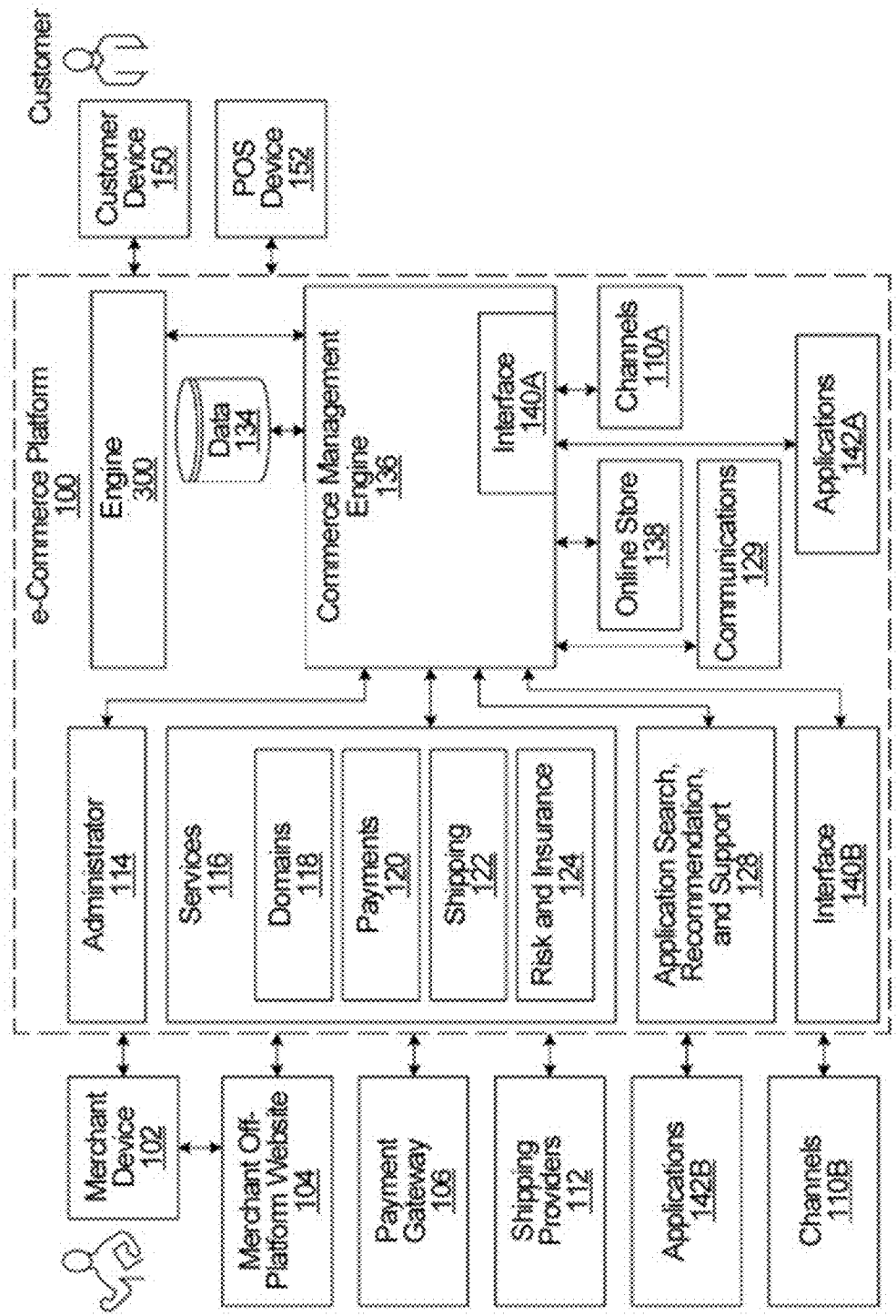
FIG. 3 illustrates the e-commerce platform of FIG. 1 but including an engine for generating new output images using generative adversarial networks (GANs), according to one embodiment.

The functionality described herein may be used in e-commerce systems to provide improved customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented image processing and generation system and engine that implements the functionality described herein for use by the e-commerce platform 100, the customer device 150 and/or the merchant device 102. The engine 300 may also be referred to interchangeably herein as an image generation engine 300.

Although the engine 300 is illustrated as a distinct component of the e-commerce platform 100 in FIG. 3, this is only an example. The engine 300 could also or instead be provided by another component residing within or external to the e-commerce platform 100. In some embodiments, either or both of the applications 142A-B provide an engine that implements the functionality described herein to make the functionality available to customers and/or to merchants. Furthermore, in some embodiments, the commerce management engine 136 provides the aforementioned engine. However, the location of the engine 300 is implementation specific. In some implementations, the engine 300 is provided at least in part by an e-commerce platform (e.g. e-commerce platform 100), either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms and may be implemented in other computing devices.

Generally, the engine 300, also referred to as an image generation engine (see FIG. 4 also) is configured for the automated processing of input images and generation of output images such as for display on user interfaces, whereby a first input image is at least partially replaced with portions from one or more other input product images using one or more generative adversarial networks. The images may be those encountered during a user's browsing history (e.g. as may be displayed on the customer's device 150 for displaying the merchant off-platform website 104), this may include the first input image being a product image of a user such as a model or customer wearing a number of products offered by the merchant. The other input product images may include further images encountered by the customer device 150 while browsing the merchant off-platform website 104, such as one or more e-commerce items in the customer's online shopping cart as displayed on the merchant off-platform website 104. As will be described such input images (or portions thereof) may be automatically combined in an intelligent manner by the engine 300, such as during browsing the webpages of the merchant off platform website 104 to result in one or more realistic output image(s) which display products from the first input image and the other input product images which are relevant to the user of the customer device 150 in use on an environment (e.g. as worn by the model on the first input image).

Figure 4:
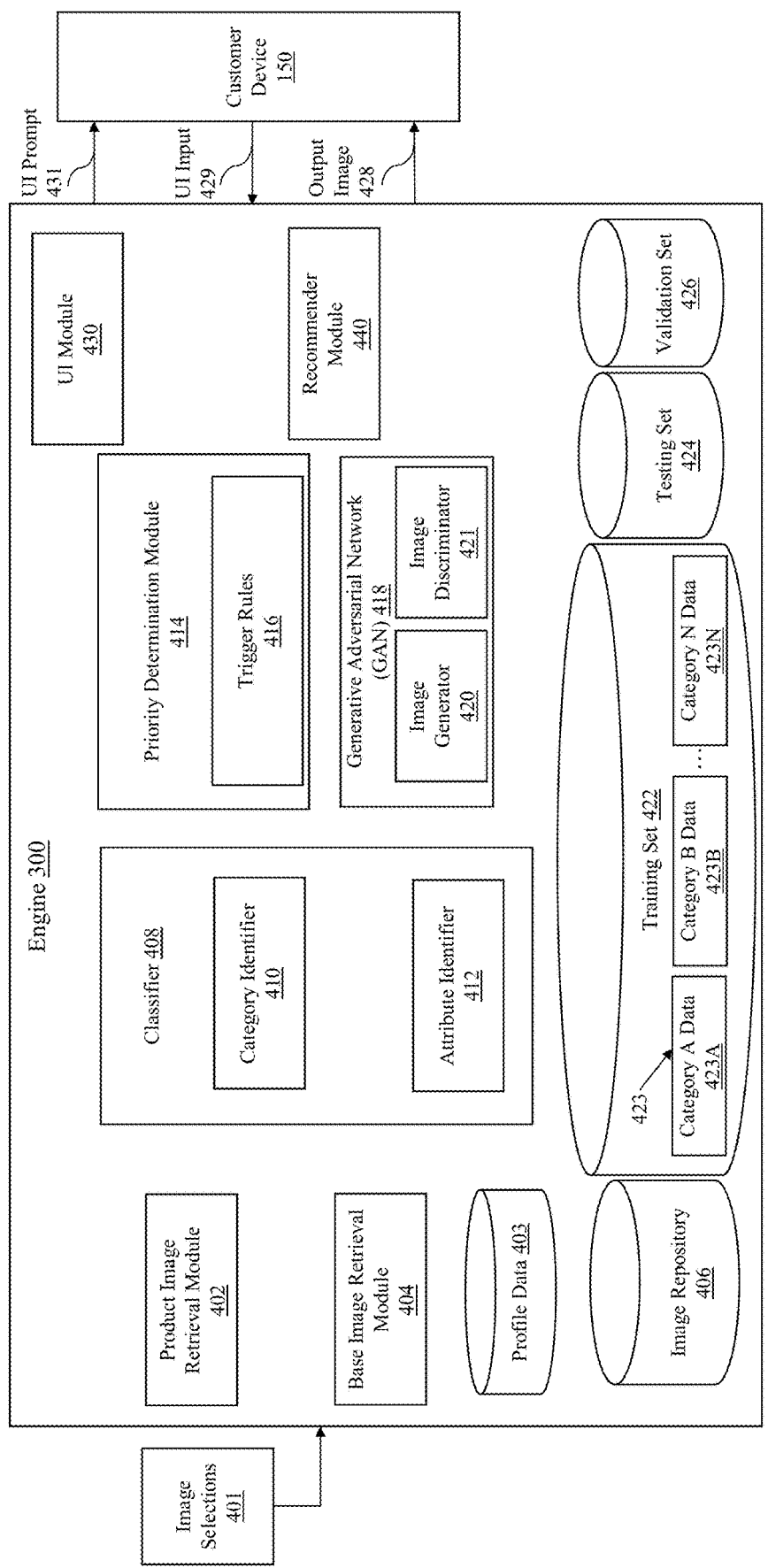
FIG. 4 is one example of the engine of FIG. 3 for generating the output image for a customer device, such as based on extracting one or more objects from at least one image and replacing image objects for similar types of products in another image, according to one embodiment.

The engine 300 generates images automatically by applying machine learning including using one or more Generative Adversarial Networks (see also GAN 418 in FIG. 4). The GAN 418 may include a single GAN trained separately on each expected product category type or alternatively a set of independent GANs each configured to recognize one of the product category types. For example, each of the GANs may be trained on a particular product category type expected for each of the input images considered by the image generation system. In the case of the image generation engine 300 being applied to apparel websites offered by the merchant device 102, such as via merchant off-platform website 104, the product categories may include tops, bottoms, accessories, etc. Other product category types may be envisaged depending on the particular application of the engine 300. Conveniently, the engine 300 utilizes the trained GAN to generated output image(s) comprising visual aspects/features of the one or more input images (e.g. a first input image of a model wearing one product offered by the merchant device 102 and a second input image of another product as a stand-alone offered by the merchant off-platform website 104), the images combined and overlaid in a manner that is realistic.

Referring to FIG. 4, shown is a detailed block diagram view of the engine 300, e.g. the image generation engine 300 of FIG. 3, according to one embodiment. The engine 300 identifies relevant images for processing, such as via image selections 401, to determine whether images relating to products (and which portions thereof) should be combined to generate an output image, which combines in a realistic manner components of the input images (e.g. via the input images having relevant features and components encoded). The image selections 401 may include images provided to the engine 300 for processing, such as input images relating to products offered by a merchant online and identified during a customer using a customer device 150 browsing one or more merchant off-platform websites 104 via the merchant device 102 and/or the e-commerce platform 100 shown in FIG. 3. Alternatively, such images may be selected by the user of the customer device 150 via accessing applications 142A, such as web applications on the customer device 150 relating to a particular web merchant. In an e-commerce application, the image selections 401 may relate to images obtained from a user's browsing history of an online store, and including images stored in an online shopping cart as will be described. The image selections 401 may be separated into one or more images for use by a product image retrieval module 402, and a base image retrieval module 404 and/or stored within an image repository 406 configured for storing images, such as e-commerce images to be processor and analyzed by the image generation engine 300.

Each of the product image retrieval module 402 and the base image retrieval module 404 may be configured to receive different images, such as e-commerce images gathered during browsing activity of a user on a merchant website. Each of the product image retrieval module 402 and the base image retrieval module 404 may include image encoders to make the received images compatible for processing by the engine 300, such as to encode all or parts of a typical received image of interest relating to multiple features including: pose of model or object, skin tone features, facial features, and garments including garment or product class information. For example, in the case of apparel, objects may be encoded with a predefined set of garment classes such as jackets, pants, dresses, etc. Examples of such garment classes being extracted shown in FIG. 5. In some aspects, facial information may be encoded separately, so that different facial expressions of a person(s) on an image may be selected either automatically, semi-automatically or via user input into the customer device 150. Such user input to customize the features selected for an image may be selected via image selections 401. In one aspect, the image selections 401 may include customization metadata whereby a user can set profile information for the user, such as user preferences for the category of products shown in the images such as to customize the generation of the output image 428 (e.g. via selecting categories of products which are of interest to the user via the customer device 150 by way of the image selections 401).

Figure 5:
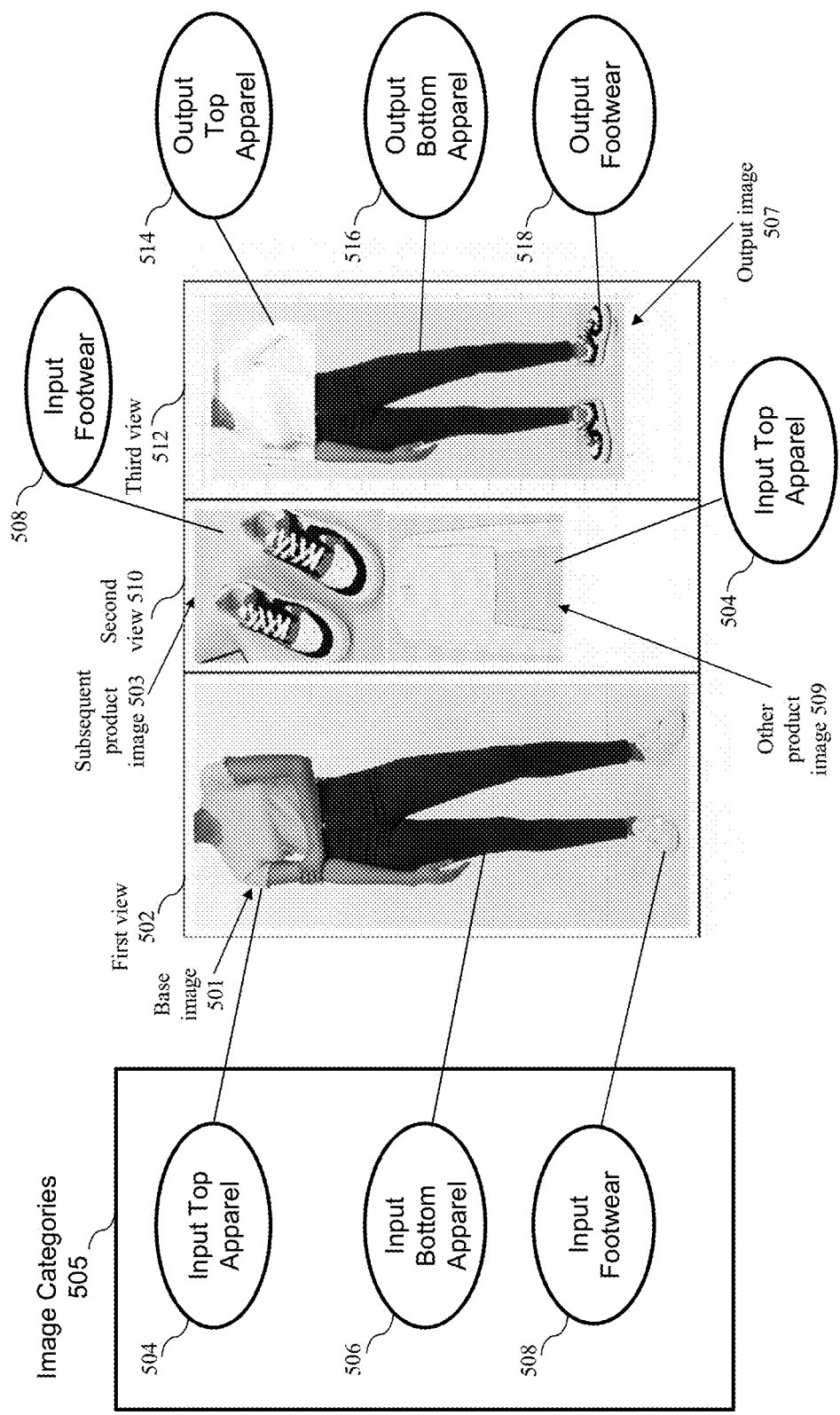
FIG. 5 shows an example set of images processed by the engine of FIG. 4, according to one embodiment.

The base image retrieval module 404, may be configured to retrieve a base image that may be altered or otherwise combined in an intelligent and dynamic manner with one or more components of other input images, as disclosed herein. For example, the base image may be an image of one or more products offered by an online merchant (e.g. via the merchant off-platform website 104) in use by an end user or object. In one example, in the case of products being apparel, the base image may show the products offered by the online merchant worn by one or more persons (also referred to as model(s), herein). In the case of products being offered including houseware furnishings, e.g. pillows, the products may be shown in use such as on another object, e.g. a couch. Another example of such a base image is shown in first view 502 of FIG. 5 showing an image browsed upon including a default product image on a product web page offered by the merchant off-platform website 104 for a particular product, e.g. black jeans offered for sale on the web page.

In at least some aspects, the source person depicted in the base image wearing the one or more products offered by a merchant off-platform website 104 and processed by the base image retrieval module 404, may be automatically generated such as by way one or more generative adversarial network(s), an example of which is shown at the GAN 418. The generated source image may be stored in the image repository 406 for subsequent access by the engine 300 and for use by the base image retrieval module 404 to generate the output image 428. In some aspects, the generation of the source person in the base image for the base image retrieval module 404, may be processed by inputting one or more predefined images as retrieved from the image repository 406 into the GAN 418 to generate digitally realistic images output from the GAN 418, having altered features according to the parameters input to the GAN 418, e.g. generating an image with an altered pose from the input image. As described herein, the GAN 418 is configured to generate output images which emulate real world sample images as closely as possible.

In at least some aspects, the engine 300 may further store profile data 403 relating to profile information for users of associated e-commerce website(s) and/or e-commerce merchant profiles. In such aspects, the base image retrieval module 404 and/or product image retrieval module 402 may further be configured to select and/or modify input images from the image repository 406 based on the profile data 403 for a particular user of the e-commerce site and/or merchant. In one example, the profile data 403 may include user or buyer profile information such as physical attributes of a buyer interacting with a particular e-commerce site (e.g. height, complexion, face shape, etc.). In this example, the base image retrieval module 404 may be configured to retrieve a particular image from the image repository 406 containing products of interest to the user on the particular e-commerce site (e.g. selected for purchase) having a source person most closely matching the profile attribute information (e.g. buyer profile information) for the user interacting with the e-commerce site as retrieved from the profile data 403.

The product image retrieval module 402, may be configured to retrieve from the image selections 401 and/or image repository 406, one or more other product images which are to be combined with the base image obtained by the base image retrieval module 404, in an intelligent manner to generate an output image 428 shown in FIG. 4. The other product images provided by the product image retrieval module 402 may include for example, images of one or more e-commerce products offered by an online merchant such as via the merchant off-platform website 104. In one e-commerce example, the other images may include product images such as stand-alone product images as may be previously selected or tagged via the customer device 150 and placed into an online shopping cart (e.g. for the merchant off-platform website 104) as shown in a second view of FIG. 5.

Referring again to FIG. 4, the image generation engine 300 further comprises a classifier 408 comprising a category identifier 410 and an attribute identifier 412. The image generation engine 300 further comprises a priority determination module 414 comprising a set of trigger rules 416, one or more generative adversarial network(s), also referred to as GAN 418 comprising an image generator 420 and an image discriminator 421. The image generation engine 300 further comprises one or more modules for testing, training and validating the model formed by the generative adversarial network (GAN) 418 comprising a training set 422 (further comprising category specific data 423 including category A data 423A, category B data 423B, up to and including category N data 423N). The testing set 424 and the validation set 426 also includes repositories of testing and validation data for generating the machine learning model formed by the GAN 418.

The image generation engine 300 may comprise additional computing modules or data stores for implementing the operations described herein in various embodiments. Additional modules and devices that may be included in various embodiments are not shown in FIG. 4 to avoid undue complexity of description. For example, the user device (e.g. customer device 150) providing the image selections 401 and the network through which the user device communicates with the image generation engine 300 are not explicitly shown in FIG. 4 for simplicity of illustration.

Classifier 408

As shown in FIG. 4, the classifier 408 is configured to receive a first input image depicting a first set of products, preferably the first set of products in use on a person or an object as provided by the base image retrieval module 404. The classifier 408 further receives a second input indicative of product image(s) of relevance or interest to a user of the customer device 150. The one or more other input images depict other products selected by a user, such as via a user interface of a requesting device, e.g. the customer device 150. An example of such is shown in the second view 510 of FIG. 5 of selecting and placing products including black and white shoes and a white top into an online shopping cart for the associated online merchant.

In at least some aspects, the classifier 408 is a convolutional neural network (CNN) classifier. The CNN classifier is applied for image analysis and processing including tasks of image recognition, object detection, classification and segmentation as described herein.

The classifier 408 is configured to perform object detection on the received input images from the product image retrieval module 402 and the base image retrieval module 404. The object detection may be performed via the category identifier 410, an example of which is a supervised machine learning model trained to perform classification based predictive modeling. The category identifier 410 may be trained by assigning a class category label to input image examples and may be a binary classifier or a multi label classifier configured to predict multiple categories of product types present in each image. Thus, the classifier 408 may be trained based on a dataset of known images to detect product categories, e.g. on a first input image, the first set of products and on a second image, the second product categories for other products. In at least some embodiments, the category identifier 410 may utilize one or more of: logistic regression, naive Bayes classifier, k-nearest neighbour classification, deep learning neural networks, decision tree or support vector machine based predictive classification using machine learning. In other aspects, ensemble machine learning classifiers may be used such as random forest classification, bagging, and boost algorithms, etc.

Preferably, the category identifier 410 is trained using labelled category data for associated images with different types of known categories of products (e.g. for apparel the categories may include: tops, shorts, pants, skirts, dresses, footwear, children's wear, accessories, etc.). Additionally, the attribute identifier 412 may be trained to recognize and define expected image boundaries of each identified category product type based on determining the relevant product (or product type) present in an image. The attribute identifier 412 may thus perform object localization to identify location of one or more identified category of objects (e.g. as classified via the category identifier 410) in the digital images received at the classifier 408 and drawing a bounding box defining their extent. Such a bounding box may be defined by one or more points representing image coordinates, a width, a height, etc. In some cases, the bounding boxes may be visually displayed on top of the original image (e.g. base input image from the base image retrieval module 404 or additional product image from the product image retrieval module 402) to indicate the boundaries of the two identified products.

Thus, in combination, the category identifier 410 and the attribute identifier 412 may collaborate to perform object recognition or detection to localize and classify each of the product objects in the received images.

The attribute identifier 412 may also be configured as a machine learning model classifier for identifying various attributes of each including image attributes such as identifying a pose or other visual characteristic of a person wearing the products such as in the base image 501 of FIG. 5.

Thus, in one implementation, the classifier 408 may include an object detection model, which is configured to detect, categorize and define bounding edges around products present in an image, such as via the category identifier 410 and the attribute identifier 412.

E-Commerce Example Application

Referring to FIGS. 3-5, in FIG. 5 there is shown a schematic illustration depicting an example processing of input images by the engine 300 of FIG. 4 to generate an example output image 428 (shown as example output image 507 in FIG. 5) in the context of an e-commerce application and in accordance with one embodiment.

Generally referring to FIGS. 4-5, a user of the customer device 150 may browse through an online store (e.g. online store 138) and add a first product containing a white t-shirt into their cart (having an associated first image, shown as other product image 509); the user may subsequently visit, hover over, or otherwise select a second product on the online store (e.g. online store 138) via one or more webpages, this may include visiting the product webpage for black pants (having an associated second image shown as the base image 501). As noted earlier, an online store 138 may refer either to a collection of storefronts supported by the e-commerce platform 100 (e.g., for one or a plurality of merchants) or to an individual merchant's storefront (e.g., a merchant's online store) as may be provided on one or more merchant off-platform website(s) 104.

As will be described, the engine 300 is configured to automatically classify the product categories in the first image and the second image via the classifier 408. Upon detecting that the first product which is confirmed of interest by the user (e.g. placed in the cart) and the first image contains a "top" category of apparel (based on the classifier 408) and that the second image also contains a matching "top" category of apparel that has not specifically been selected of interest to the user, the engine 300 determines that the "top" category of apparel in the second image may be replaced with that in the first image to generate an output image 428. This may be done either automatically via the GAN 418 or the user initially receives a prompt on the user interface of the customer device via a UI module generating a UI prompt 431 to replace the top in the model picture shown as the base image 501 with the white top in the cart shown as the other product image 509. If the user accepts, e.g. via input on the user interface on the customer device 150, an output image 428 is generated, using the GAN 418 that has been trained historically on the "top" category of images (e.g. by inputting the two images to the trained GAN 418). Generally, the GAN 418 comprises an image generator 420 and an image discriminator 421 that work together once trained on actual images of "tops" and "models" to generate a new synthetic instance of image data that appear visually realistic. The output image 428 generated by the GAN 418 maintains the realistic look of the model wearing this item in the customer's cart.

In the example of FIG. 5, the first view 502 which may be displayed on the customer device 150 depicts a base image 501. In the example shown, the base image 501 is retrieved when a customer on the customer device 150 searches for "black jeans" on an online merchant's website to result in a display of the "black jean" images and/or selects for further viewing the base image 501 on a product webpage (e.g. merchant off-platform website 104). The category identifier 410 is configured to identify distinct items of apparel worn by the person shown in the first view 502. Such image categories 505 are shown as input top apparel 504, input bottom apparel 506, and input footwear 508 as determined by the object detection and category identification performed by the category identifier 410. In this example, the category identifier 410 may have been trained on a large data set containing various apparel and tagged according to the product type or category (e.g. tops, pants, shoes). In at least some aspects, the attribute identifier 412, may have been trained based on historical images of various apparel and corresponding attributes, to identify attributes of each of the image categories 505 including performing object localization to locate the presence of each of the categories of objects detected in the image categories 505 and the corresponding bounding boxes for such.

Additionally, as shown in FIG. 5, the classifier 408 may perform a similar image classification, and object detection to subsequent images of relevance. In the example of FIG. 5, the customer browsing an online store (e.g. online store 138) provided by the merchant off-platform website 104 via the customer device 150 may browse for and place additional products in an online cart as shown in the second view 510 as provided by the merchant off-platform website 104. For example, the customer may locate a white laced top as shown in the other product image 509 and black and white sneakers as shown in subsequent product image 503. These may be added onto the user's online shopping cart as shown in the second view 510. The classifier 408 retrieves such subsequent input images (e.g. via the product image retrieval module 402 shown in FIG. 4) and analyzes the contents of the images to perform object identification, classification and localization. As shown in FIG. 5, the subsequent product image 503 is classified as input footwear 508 category and the other product image 509 is classified as input top apparel 504. In at least some aspects, corresponding bounding boxes may also be defined around each identified object in the image.

In at least some aspects, other methods of selecting the input or source images used to generate the output image 428 may include, but not limited to: browsing an e-commerce product on the e-commerce website; selecting an e-commerce product on the e-commerce website for detailed viewing; or adding an e-commerce product to an electronic cart of the e-commerce website (as shown in the second view 510 as provided by the merchant off-platform website 104).

Referring again to FIG. 4, the GAN 418 is configured to generate new synthetic instances of data that appear visually realistic. Generally, the GAN comprises an image generator 420 model that is trained to generate new example images and an image discriminator 421 model that tries to classify example images as either real or fake (e.g. generated). The two image generator 420 and image discriminator 421 models are trained until the image discriminator 421 model fails at least half of the time in detecting digitally generated images as "real images" or more often depending on the model settings meaning that the generator is at this point generating plausible examples. Once this point has been reached the GAN 418 may be considered as trained for subsequent testing via the testing set 424, validation via the validation set 426 and application of current image data as provided from the classifier 408.

In at least some embodiments, the one or more GANs 418 are individually trained on training images (including images corresponding to a particular category of images, e.g. category A data 423A in the training set 422) for the output of realistic person images and product images. One or more input images are received by one or more trained GANs, which output realistic output images 428 (e.g. artificially generated images indistinguishable from real photos) comprising portions of the images maintained from the one or more input images.

For example, for e-commerce products, the one or more GANs 418 may be trained for the output of realistic images of models wearing items of clothing as the output image 428. One or more input images obtained via image selections 401 (e.g. which may be retrieved during browsing an e-commerce site, by adding to a cart, hovering over a product, etc.), including images of articles of clothing and models wearing items of clothing, may be received by the one or more trained GANs 418, which output one or more composite images as output image 428 comprising features of the one or more input images. In this example, the output image 428 may be a model captured in a first input image (e.g. base image 501 in FIG. 5) wearing one or more articles of clothing captured in subsequent input image(s) (e.g. other product image 509). The features of the first input image (e.g. base image 501 in FIG. 5) which may be changed by a subsequent input image (e.g. subsequent product image 503 or other product image 509) may include: aspects of an image—such as an article of clothing; one or more properties of a visual element—such as skin colour, clothing colour, garment shape, face shape, etc.; or one or more properties of an area of an image—e.g. background colour, proportion of image occupied by a model, light intensity, etc. The output image 428 may include one or more 2D images. Additionally or alternatively, output image 428 may include a 3D image or model generated by a subset of the one or more GANs 418 and/or one or more 2D images that correspond to such a 3D image or model.

Referring again to FIGS. 4 and 5, the classifier 408 detects a beige t-shirt on a base image 501 and identifies that it belongs to the same object class as the white laced top in the online shopping cart shown in the other product image 509 (e.g. both are input top apparel 504 or T-shirts). Further, the classifier 408 detects the plain white shoes in the base image 501 and identifies that it belongs to the same object class as the black and white shoes in the subsequent product image 503 in the online shopping cart. This determination of matching categories may also be provided to the GAN 418.

In at least one aspect, the matching performed by the engine 300 between the two or more input images (e.g. the base image 501 and the product image 503) used to generate the output image (e.g. the output image 509) may also take into account product metadata associated with one or more items of interest on a particular e-commerce website (e.g. product metadata for the base image 501 for products in the cart and/or product metadata for the subsequent product image 503) in order to perform a more accurate matching of objects in the images. Such product metadata, which may be linked to the product images of interest, may be provided by a merchant or other user when creating the product information on the e-commerce platform 100 and may include textual product descriptions and labels such as "Summer Apparel" "Footwear", "Sliders" etc. Such product metadata may be used, in at least some embodiments, by the engine 300 to further optimize the object detection including category identification (e.g. as performed by the classifier 408) and matching of objects or products between images of interest as described herein in order to perform the generation of output images by the GAN 418.

In one implementation, the GAN 418, upon receiving the object detection and classification information provided by the classifier 408 (e.g. the image categories 505 and the corresponding object localization information) is configured to perform the matching and determine whether a match exists between the base image 501 product categories and images in the second view 510, as provided in the subsequent product image 503, and the other product image 509. Since a category match exists as defined by the classifier 408, the GAN 418 having been trained on each of the potential category of products in the images, may process each of the subsequent product image 503 and the other product image 509, either concurrently (e.g. via multiple GANs 418 configured for a respective category of products) or iteratively (e.g. via a single GAN configured for multiple category of products).

Referring to FIG. 4, for simplicity of illustration and in accordance with one embodiment, the GAN 418 is illustrated as being a separate component from the classifier 408. Alternative configurations may be envisaged in various embodiments as described herein. For example, the classifier 408 components and functionality can be included as part of the GAN 418 and functionality, in at least some implementations. In yet a further alternative embodiment, the classifier 408, the priority determination module 414 and associated functionality described herein are provided within the GAN 418. Thus, while one or more components of the engine 300 have been illustrated as being separate from one another, in various embodiments, the modules and devices illustrated in FIG. 4 can be combined without departing from the present disclosure.

Thus, in one implementation of the example of FIG. 5, the engine 300 may via the GAN 418 automatically substitute the beige top in the base image 501 with the white laced top for the customer's online shopping cart in the other product image 509 (e.g. both categorized as input top apparel 504) and replace the plain white shoes in the base image 501 with the black and white shoes in the subsequent product image 503 also present in the customer's online shopping cart via the customer device 150. This forms the image information for generating the output image 428 as shown in FIG. 4 or in the example of FIG. 5, the output image 507 in the third view 512. The output image 507 is formed by retrieving relevant images from the second view 510 (e.g. the online shopping cart) based on a degree of category match. The output top apparel 514 category corresponds to that of the other product image 509 and the output footwear apparel 518 corresponds to that of the subsequent product image 503, while the output bottom apparel 516 has been maintained from the original image in the base image 501 (e.g. the input bottom apparel 506) as well as the model or person wearing the products in the output image 507 retained from the base image 501.

The GAN 418 is thus configured to provide the output image 507 in a way that combines relevant additional images or portions thereof with a base image. In the example of FIG. 5, the output image 507 is a result of combining and overlaying the images (or portions thereof) from the online shopping cart items in the second view 510 onto a first image showing products worn on a person in a first view 502, the GAN 418 being trained to maintain the shape, pose and proportion of the model in the base image 501 for the output image 507.

Referring to FIG. 4, in some embodiments, the image generation engine 300 further comprises a user interface (UI) module 430. The UI module 430 may be triggered by the classifier 408 and/or the GAN 418 to provide UI prompts to the user of the customer device 150 (e.g. navigating the merchant off-platform website 104) as to the generation of the output image 428. For example, the UI module 430 may a provide UI prompt 431 which indicates that there's a match between at least one category of a first input image (e.g. the base image 501) and a category of a subsequent input image (e.g. the subsequent product image 503 as may be present in an online shopping cart the user navigating the merchant off-platform website 104) and associated product details for the images where the match exists. An example of such a display of UI prompt 431 displayed on a display of the customer device 150 may be seen in FIG. 6. The UI prompt 431 may allow a user to indicate whether a combination of images (e.g. a base image containing a first set of products and subsequent images provided from an online shopping cart containing a second set of products) is desired and any variations to such combinations.

In the example of FIG. 5, in some aspects where the engine 300 is configured to request user input prior to generating the output image 428 (or output image 507 in the case of FIG. 5), the UI module 430 may be configured, in response to receiving an indication of category matches between input images as provided by the classifier 408, to prompt the user via the UI prompt 431 as to whether to replace the beige top on the image of the person in the base image 501 with the white laced top in the other product image 509 and the plain white shoes in the base image 501 with the black and white shoes in the subsequent product image 503. This UI prompt 431 may be presented on the customer device 150 in the form of a visual highlight on the beige top belonging to input top apparel 504 in the base image 501 that is selectable by the user of the customer device 150. In one example, if the user of the customer device 150, in response to receiving the UI prompt 431, selects the UI element to generate an image, this UI input 429 is fed back into the UI module 430 which triggers the GAN 418 to generate the output image 428. In one implementation, multiple GANs 418 may be used including a first GAN 418 trained for "top" or input top apparel 504, and a subsequent GAN 418 trained for "shoes" or input footwear 508. Using the GANs 418, the beige top in the base image 501 is swapped with the white laced top in the other product image 509 from the customer's online cart in a way to generate a realistic output image of the model wearing the updated top.

In the example case of the GAN 418 having multiple GANs trained each for different image categories 505, in one implementation, the first GAN is trained for the "top" or input top apparel 504 category of images as trained from the category specific data 423, will replace the top in the model's picture in the base image 501 with the white laced top in the other product image 509 to generate a first output image. This step is repeated for the shoes belonging to the input footwear 508 category by the GAN 418. So that the first output image with the replacement top is fed to a subsequent GAN 418 trained for "shoes" (e.g. from the category specific data 423) to subsequently replace the shoes in the model's image in the first output image to provide a second output image as shown in the output image 507 of FIG. 5.

Priority Determination Module 414

In at least some embodiments, the one or more GANs 418 may be trained for the output of realistic images whereby one or more specified features of the one or more input images remain unprocessed and thus appears in the output image generated. For example, for e-commerce products, the trained GANs may receive one or more first input images of a model wearing items of clothing and one or more second input images of articles of clothing, and output a realistic image of a model captured in at least one first input image, wearing a specific article of clothing captured in at least one second input image, whereby all other articles of clothing worn by the model in the first input images are maintained in an unprocessed condition and thus appear in the output image.

In at least some embodiments, the image generation engine 300 further comprises a priority determination module 414 configured to determine whether features of each of the input images (e.g. from the product image retrieval module 402 and the base image retrieval module 404) should be maintained or if they can be altered when combined to generate the output image 428. The priority determination module 414 may access a set of trigger rules 416 which dynamically define the rules for which features in an input image should be maintained and which can be changed. For example, in some cases, even if a user browses to a webpage of interest on the online store for a product, and the base image for such product of interest depicted visually on a person has at least one product category which matches a product category of a product image already located in the online shopping cart, the priority determination module 414, may access the trigger rules 416 and determine that the matched product category should not be replaced in the base image with the product image to generate the output image 428, that is the matched category in the base image should remain untouched. In one aspect, this may occur because a priority value assigned to the first image portion in the base image (e.g. belonging to a first category of product) exceeds the priority value assigned to the second image portion in the subsequent product image portion (e.g. belonging to a second category of product). For example, the image generation engine 300 may dynamically assign priority values to image portion(s) in the images corresponding to products depending on user activity in interacting with an online store and/or user profiles determining that the product corresponding to the first image portion is of high interest to the user and therefore should not be replaced (e.g. at least in relation to the second image portion).

Thus, the GAN 418 may communicate with the priority determination module 414 to determine which aspects of the base image (also referred to as the first input image of a model wearing products of interest) should remain unaltered regardless of the products/product types displayed in the second input images (e.g. images in the shopping cart). For example, the priority determination module 414 may track user activity on the customer device 150 to determine products/product types which are of high interest to the user based on prior history. In such cases, the products/product types which are determined to be of high interest (e.g. based on historical behaviours of a user or other similar users) and displayed in a first input image may be given higher priority by the priority determination module 414 than other input images and thus not replaced.

In one embodiment, the trigger rules 416 may further perform complementary object matching, to determine whether replacing one object in the first base image with other objects from the subsequent image(s) to generate the output image 428 provides products which visually complement one another in the potential output image (e.g. are visually acceptable together), the matching machine learning model as described in the co-pending U.S. application Ser. No. 17/672,755, filed on Feb. 16, 2022, the disclosure of which is hereby incorporated by reference in its entirety. For example, although two product objects (e.g. a shirt and shoes) when placed together in an image may not be visually similar, they may be aesthetically pleasing and thus, be considered a complimentary match. Examples of determining whether two objects match is provided in the corresponding U.S. application Ser. No. 17/672,755, relating to the disclosure of the training matching machine learning model. As described in the co-pending application, in some embodiments, a machine learning (ML) model may be trained using a set of digital images in which each image has two or more different objects that are considered complementary, i.e. matching. For example, in the context of e-commerce, the set of digital images may originate from one or more photoshoots in which a stylist decides which products complement each other and captures digital images, e.g. for a product fashion catalog or digital magazine. For example, a stylist may determine that jeans, striped shirt, and a handbag go well together, and take a photograph of a model wearing jeans, a striped shirt, and holding a handbag. In some embodiments, the ML model may be trained using triplet loss training. Post-training, in some embodiments, the ML model may be used to transform images of objects into feature vectors, and the computer may then determine a matching object as an object having a feature vector that is close to the feature vector of the object to be matched. Thus, following the training of the matching machine learning model, the trained matching machine learning model may then be used to determine products that are complementary.

Thus, referring back to FIG. 4, the priority determination module 414 may receive two input images (e.g. a base image and a product image) having at least some overlapping product category types and be configured to determine whether to replace the overlapping category product portions (e.g. shoes) in the first image, e.g. the base image showing products on a person with the same category of products (e.g. shoes) in the second image, e.g. the product image from the product image retrieval module 402. In some embodiments, the trigger rules 416 may process the potential output images (e.g. whereby the similar category portion in the first image is replaced or not by the corresponding category portion in the second image) and determine whether the potentially resulting output image would results in products which are complementary to one another or not, in accordance with the determinations made by the ML matching model described above. Accordingly, in some embodiments, the priority determination module 414 may be configured to direct the GAN 418 to only combine the first base image (or a portion thereof) with the second product image (or a portion thereof) if the resulting output image of combined products would be complementary, thus a matching trigger would be met as per the trigger rules 416. That is, in one example, the GAN 418 would only combine images (or portions thereof) with one another if the resulting products in the potential output image would be complementary to one another (e.g. satisfying a matching trigger).

In some implementations, components of the classifier 408 and/or priority determination module 414, such as the ML matching model described above for performing matching of objects and/or matching of categories of objects between two or more images (e.g. a base image and a product image) may be provided as a part of the GAN 418 for performing the matching process described herein. In such implementations, the GAN 418 as illustrated in FIG. 4, may simultaneously be configured to perform both the matching and subsequent substitution of components of images based on the match between the product categories as may be determined between two or images.

In one example implementation, there may be a pair of black jeans and a red top in the customer's online cart displayed on the customer device 150. The images corresponding to these products may be retrieved in the product image retrieval module 402. The customer may then browse on the merchant off-platform website 104 for a white top. The image for the white top may include a model wearing this top and is retrieved by the base image retrieval module 404. In this example of the image of the white top, the model may be wearing blue jeans. If, the desired outcome is for the engine 300 to replace only the stock blue jeans in the image with the black jeans in the customer's cart, then the priority determination module 414 may be pre-configured to determine that since the white top is an item of interest, as navigated to by the user and specifically searched for, then this feature of the image should not be replaced. Thus, based on accessing the trigger rules 416, the priority determination module 414 determines the white top is the item of interest and should be kept in the output image 428 not replaced with the red top also in the customer's cart.

Thus, the engine 300 may be configured to dynamically determine whether portions of images or features of images should be kept and present in the output image. In the example above, the priority determination module 414 may determine that the white top should remain unprocessed.

In the embodiment of the priority determination module 414, the classifier 408 may be applied first to the input images to detect objects in the images as described herein, e.g. the distinct items of clothing in each image including a white top, and black jeans. The classifier 408 may also be configured to define and output bounding boxes corresponding to regions of the image containing the distinct items of products, e.g. clothing (e.g. via the attribute identifier 412).

Each bounding box generated by the attribute identifier 412 may be treated as representing an image on its own. Then a separate model, shown as the priority determination module 414, may be trained to analyze the product title/product description/metadata and determine the item of interest (or the item of high priority) and specific features i.e white coloured, top versus skirt/pants. This information may be stored in the trigger rules 416. The priority determination module 414 may additionally be trained to select an image based on the identified product such that if the model identifies "white top" as product of interest (e.g. as stored in the trigger rules 416), it will be able to match it to the image region produced by the classifier 408 model. In some implementations, the matching of similar categories of products within images may be performed by the GAN 418. According to the present aspect, the GAN 418 will be fed the image regions from the priority determination module 414 and/or the classifier 408 that do not correspond to the product of interest.

In at least some examples, the bounding boxes used by the classifier 408 may be defined using the methods described in corresponding U.S. application Ser. No. 17/672,755, the entirety of the disclosure incorporated herein by reference. For example, the classifier 408 may be implemented by an object classification model that identifies separate objects within an input image and then creates separate images for each object by cropping the image according to the boundaries established by the object classification, where the objects may correspond to e-commerce products and/or the environment (e.g. person wearing the e-commerce products). In the example methods of identifying, extracting product images, and classifying attributes of said images, the set of digital images and the extracted product images including extracted attributes may be saved as part of the training set 422 of the image generation engine 300.

Although the embodiment illustrated in FIG. 4 illustrates a single GAN 418 for simplicity of illustration, a plurality of GANs may be envisaged. In some embodiments, the engine 300 may comprise a plurality of GANs 418, by which one or more realistic output images of one GAN are used as input images by one or more subsequent GANs. For example, for e-commerce products, a first trained GAN 418 within the example embodiment disclosed may receive one or more first input images of a model wearing items of clothing (e.g. as received from the base image retrieval module 404) and one or more second input images of articles of clothing (e.g. as received from the product image retrieval module 402), such as a pair of jeans, and output a realistic image of a model captured in at least one first input image, wearing a specific article of clothing, such as the pair of jeans, captured in the second input image using a first trained GAN 418. Such operations may be facilitated by the classifier 408 first performing object detection, classification and localization as described herein. A subsequent trained GAN 418 may receive (e.g. in response to the browsing history, shopping cart or e-commerce activity or other triggers indicating updating the prior output image) one or more other input images comprising realistic images of a model wearing a specific article of clothing, such as a pair of jeans output from the prior GAN 418, and one or more additional input images of articles of clothing (e.g. user adds additional products to online cart displayed on the customer device 150), such as a shirt, and output a realistic image of the model captured wearing specific articles of clothing provided in the additional input images, such as to result in an output image (e.g. output image 428) of the model wearing the pair of jeans and the shirt, where other articles of clothing depicted in the input image(s) of the model remain unprocessed in the one or more output images. As described earlier, the priority determination module 414 may be used to determine which items within an image are of interest so that they remain unprocessed in the output image 428.

In at least some embodiments and referring to FIG. 4, the image generation engine 300 may thus first classify features of one or more input images via the classifier 408. The input images may be provided by way of the product image retrieval module 402 (e.g. product webpages browsed to) and the base image retrieval module 404 (e.g. an image of a model containing one or more products). The classification as described herein may include classifying products displayed on the input images as belonging to product class categories via the category identifier 410, and/or to detect boundary lines for each of the products displayed on the image via the attribute identifier 412 based on using the trained classifier 408 model. Preferably, each of the GANs 418 may be trained for particular category of image features (e.g. one GAN may be trained for images of tops—Category A data 423A, another GAN for images of bottom apparel—category B data 423B, another GAN for images of model poses or face features—category C data 423C, etc.). Thus, upon detecting the classification of the features in the input images, the input images may be directed to the GAN 418 for processing that particular type or category of feature. In some cases, a series of GANs 418 may be used iteratively with each GAN 418 processing one classified feature of the image. In yet further embodiments, the engine 300 may further utilize the priority determination module 414 to classify specific conditions or features of one or more input images which are to remain unprocessed for each of the one or more GANs 418 (or alternatively, such features may not be fed into the GAN for altering). The features may be defined as being of interest in the trigger rules 416. Additionally, one GAN 418 may be allowed to vary features related to apparel tops but not modify any other features such as pose or shading of image. For example, in implementations of the engine 300 where one or more GANs 418 are used subsequent to one another, the engine 300 may classify a condition, feature or portion of the one or more input images to remain unprocessed by the first GAN 418, but are classified for processing by subsequent GANs 418.

Figure 6:
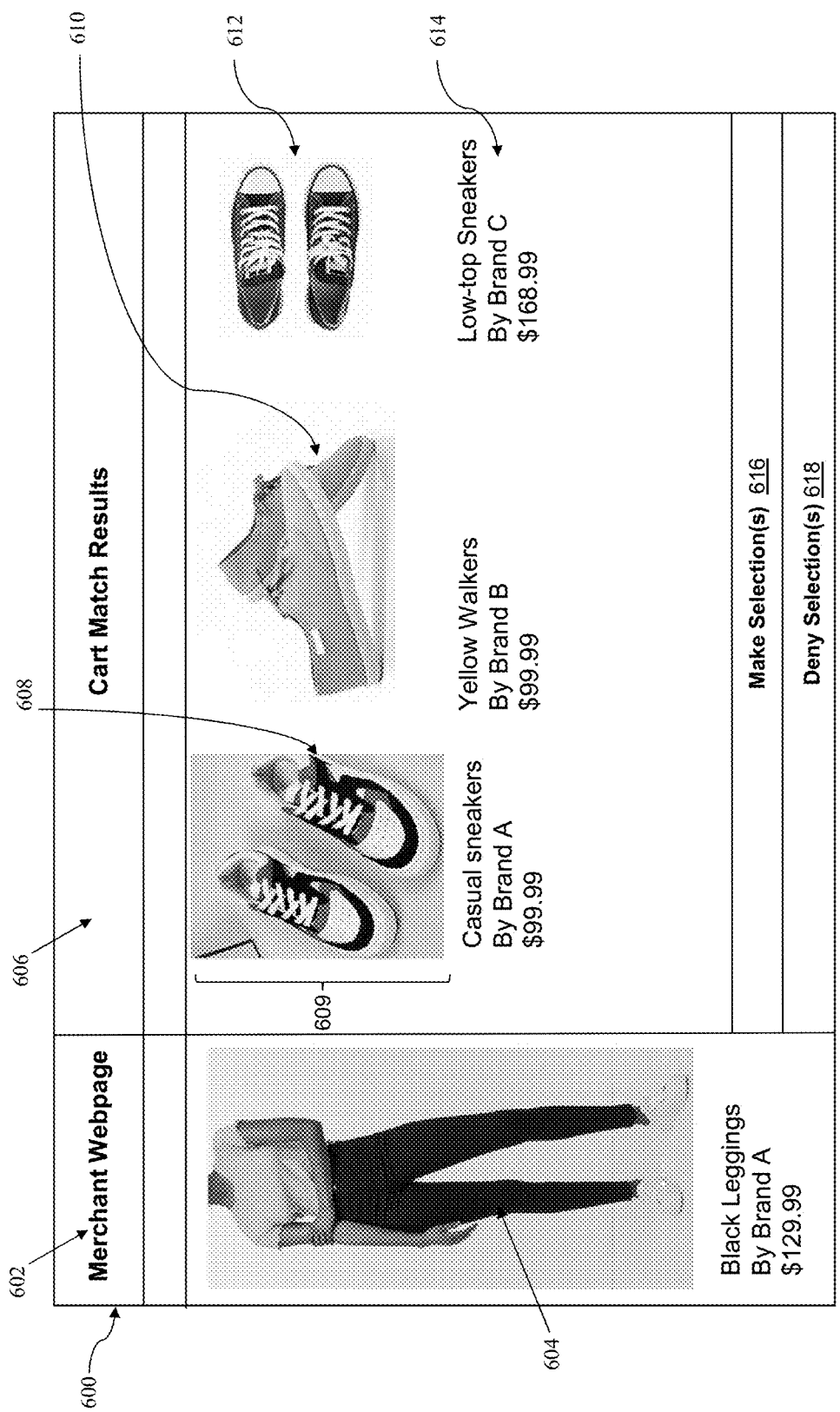
FIG. 6 shows another example set of images processed by the engine of FIG. 4 and providing a user interface for customizing the generation of the output image, according to one embodiment; and, FIG. 7 is a flowchart of an example operation of the engine of FIG. 4 based on analyzing content of images to generate the output image, according to one embodiment.

Referring to FIG. 6, shown is an example view 600 of a graphical user interface, in accordance with one embodiment, presented on the customer device 150 shown in FIGS. 1, 3 and 4, for displaying one or more online products for purchase in an online store such as on a merchant webpage, including images of the product(s) in use such as on a person or object. The view 600 of the graphical user interface may be generated by a computing device such as the customer device 150. An example of the merchant webpage shown may be provided via the merchant website off-platform 104 accessible via the customer device 150. The merchant off-platform website 104 may display information extracted from the online store 138.

The view 600 illustrates a particular merchant webpage 602, and a plurality of GUI elements in respective regions of a display such as a screen of the customer device 150. The regions may includes a first region 604, for displaying results of an online product of interest by the user browsing the merchant webpage 602 (e.g. product "Black leggings" searched by a user) and displayed in the first region 604 as overlaid on an image of a person (e.g. GAN generated) or retrieving a previously existing image of a person wearing the "Black leggings". As noted earlier, the online customer behaviour from the customer device 150 is monitored by the engine 300 shown in FIG. 4. Thus, upon determining that such product is of interest, the engine 300 is configured to classify the one or more product types displayed on the image related to the product currently of interest such as that displayed in the first region 604 (e.g. top, pants, shoes). The engine 300 is then configured to retrieve from the user's online cart in the online store for the merchant webpage 602, any products which are of similar categories to one or more of the determined product categories shown in the first image (e.g. the base image) containing the product of interest in the first region 604. The classifier 408 in FIG. 4, may determine that there are several shoes currently in the online cart of the user, which match one of the product categories, e.g. the "shoe" category for the image shown in the first region 604 (e.g. the base image). In one implementation, the engine 300 may be configured via the UI module 430 shown in FIG. 4, to present images of the products in the online cart, matching the categories of the base image and providing a UI prompt 431 requesting user feedback as to which of the product images in the online cart to use to replace a portion of the image in the base image (e.g. the first region 604) showing a product currently browsed upon or otherwise of interest. In the example of FIG. 6, the UI prompt 431 may be in the form of displaying cart match results 606, as a first product match 608, a second product match 610, and a third product match 612. Each of the matched products may have an image portion 609 and a description portion 614. Based on the cart match results 606, the user may have the option of choosing one or more products (and corresponding image portion(s) 609) from the cart to replace, in an intelligent manner as described herein, a portion of the first image, e.g. the base image shown in the first region 604. This may be performed by presenting a GUI element for the user to make selections 616 (e.g. to select one of the first product match 608, second product match 610 or third product match 612 to replace the similar category of product such as shoes in the first region 604). Alternatively, another view portion may allow the user to deny selection(s) 618 presented on the view 600. Other ways of presenting the cart match results 606 and allowing user feedback on the graphical user interface, such as via view 600 may be envisaged. In one implementation, once one of the product images from the cart match results 606 is selected (e.g. selecting the "casual sneakers" in the first product match 608), such as via the make selection(s) 616, then such feedback is provided back to the engine 300 of FIG. 4, to generate an output image which combines the base image (e.g. shown in the first region 604) with the other product image (e.g. the image corresponding to the first product match 608) to generate a desired output image 428 via the respective GAN 418 for the particular product type. As noted above, the input received from the user interface, such as the view 600 may be provided back to the engine 300 in the form of the UI input 429 for processing thereof. In this embodiment, the engine 300 may accept user input to then automatically generate the output image 428.

Figure 7:
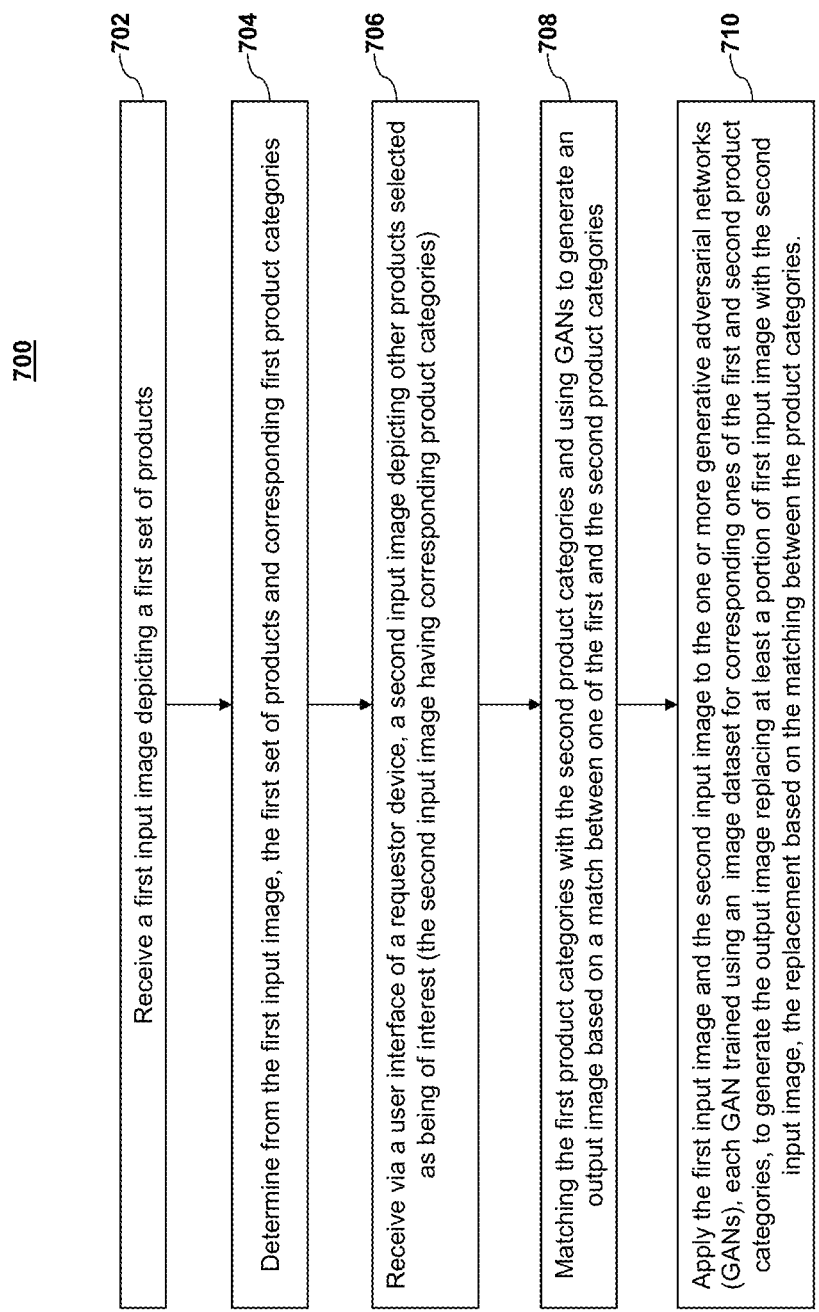

FIG. 7 illustrates an example flowchart of operations 700 which may be performed by the engine 300 for generating output images, on a computing device, such as the e-commerce platform 100 or on another computing device such as the merchant devices 102 or customer device 150. The operations 700 are further described below with reference to FIGS. 1-6. The computing device for carrying out the operations 700 may comprise a processor configured to communicate with a display to provide a graphical user interface (GUI) where the computing device has a network interface to receive various features of images containing product information (e.g. text, image attributes, metadata and other product information as may be stored in image repository 406) when executed by the processor, configure the computing device to perform operations such as operations 700.

At operation 702, the processor is configured to receive a first input image depicting a first set of products. An example of such a first input image is shown in the base image 501 of FIG. 5 or alternatively images retrieved by the base image retrieval module 404. In some examples, the first input image may thus relate to images of a person or object with one or more e-commerce products contained thereon as provided by the merchant off-platform website 104 and browsed to by the customer device 150.

Following operation 702, at operation 704, the processor is configured to determine from the first input image, the first set of products contained in the image and having corresponding first product categories. In one embodiment, the classifier 408 may be configured to determine: one or more of product categories, product category boundaries, and image features (e.g. poses), etc. based on a trained classifier 408 model that has been trained to recognize, detect and locate image objects such as different product types within an image. As discussed in the example of FIG. 5, the base image 501 may be decomposed into a set of image categories 505 for the product types, such as input top apparel 504, input bottom apparel 506, and input footwear 508.

Following operation 704, at operation 706, the processor may be configured to receive, via a user interface of a requestor device, a second input image depicting other products selected as being of interest. An example of the second input image is shown as the subsequent product image 503 or the other product image 509 in FIG. 5. As described herein, in some aspects, the second input image is an image of an e-commerce product of interest as may be designated by the user of the customer device 150, such as via image selections 401 shown in FIG. 4, which may be retrieved during browsing an e-commerce site, by adding to an online cart, hovering over a product image or description, etc. The second input image may be an image provided by the product image retrieval module 402. In one aspect, the second input image may have one or more product objects displayed thereon and corresponding second product categories for further characterizing a type of the object (e.g. type of clothing—dress, shoes, etc.). In one aspect, the second product categories may be automatically determined from the second input image via the classifier 408 model as described with reference to FIG. 4 (e.g. via the category identifier 410) which may be configured to detect specific categories of products based on prior training of the machine learning model as previously described. In other aspects, the second product categories may be detected and/or facilitated by the classifier 408 by deciphering image metadata including labelled image information such as textual descriptions of products in the second image. Other product category determination techniques for the first and second input images may be envisaged and as described in relation to FIG. 4.

Following operation 706, at operation 708, the processor detects a match between the second product categories for the other products and the first product categories for the first set of products. Such that, in response to a match between one of the first product categories and the second product categories, an output image is generated (e.g. based on at least portions of the first and the second input image) and proceeds to operation 710. In at least some aspects, as described with reference to FIG. 4, the matching may be done via the one or more GANs 418 and based on said match, the output image generated from the GAN 418. As previously described, in at least some aspects, since the second input image contains one or more products specifically identified as being of interest to the user (e.g. the user has browsed, on an e-commerce website, for a particular product having associated second input image), then such image portions in the second image identified as containing products of interest are excluded from the match detection and will appear untouched in the generated output image provided by the GAN 418.

In the example of FIG. 5, the second product categories for the subsequent product image 503 included input footwear 508 and for the other product image 509 include input top apparel 504. In the case of the second input image being the subsequent product image 503, the match exists in the input footwear 508 category between the first and the second input image in the example of FIG. 5. The classifier 408 may be configured to detect such a category match between the features in the input images as described in relation to FIG. 4. In other aspects, the GAN 418 may be configured to directly perform the match between the categories of products in the first and second input images in order to generate the output image.

Following operation 708, at operation 710, the processor applies the first input image and the second input image to the one or more generative adversarial networks (GANs) 418, each GAN 418 trained using an image dataset for a corresponding one of the first and second product categories, to generate an output image (e.g. the output image 428 or the output image 507) replacing at least a portion of first input image with the second input image, the replacement occurring based on the match between the product categories. Examples of training data is shown in FIG. 4, as the product category specific data including category A data 423A, category B data 423B, category N data 423N, each category associated with a particular type of feature, e.g. person face features, pose, skin, garment type, object type, etc.

Referring generally to FIGS. 3-7, in some implementations of the engine 300, the output image 428 provided by the GANs 418 may still be perceived to be unrealistic when assessed by human users. As such, in at least some embodiments of the present disclosure, the engine 300 further comprises a further machine learning model for receiving the image generated by the GAN 418, and trained using additional image data sets to reject generated output images 428 which do not exceed a predetermined threshold for perceived realism (e.g. a confidence score). For example this machine learning model may be an unsupervised classifier which determines whether the generated output images falls into a cluster of potentially false images or a cluster of known real images. In some aspects, the additional machine learning model is a post system convolutional neural network model (CNN) that analyzes the output image 428 and decides whether it should be provided to the customer device 150 or not.

Referring again to FIGS. 4-7, in some embodiments, the engine 300 may further comprise an additional machine learning recommender module 440 trained on historical behavior of e-commerce customers (e.g. customers who liked product A, also bought product B) to provide additional input product images (e.g. as provided by the product image retrieval module 402) for combination with existing other input base images (e.g. provided by the base image retrieval module 404) via the GANs 418. In this implementation, the engine 300 may also be configured to combine a first input image, such as a base image provided by the base image retrieval module (e.g. an image of a product in the cart) with another product image of a respective recommended product (e.g. as may be provided by the product image retrieval module 402), as determined from the recommendation model described herein, combined via the GAN 418 in the methods described herein, to generate an output image 428. Thus, in one aspect, wherein the second input image (e.g. output from the product image retrieval module 402) to be combined with a first input image (e.g. output from the base image retrieval module 404) for generating the output image, is further selected based on the recommender module 440 tracking browsing history on the e-commerce website for the online store, such as the merchant off-platform website 104, and indicating additional products of interest. Preferably, the recommender module 440 is trained on the browsing history for a set of requestor devices (e.g. customer device 150 and other devices communicated with the e-commerce platform 100).

In another example implementation of the engine 300, there is provided one or more GANs 418, each trained with one or more of image characteristics as may be stored in category specific data 423 of the training set 422, including but not limited to: image product categories, image product category boundaries, image features (e.g. poses, facial expressions), etc.

In some aspects, the engine 300 may receive one or more customer metadata such as images and/or attributes including web browsing attributes and behaviours of a particular customer browsing the online site (e.g. via the merchant off-platform website 104), such as provided by the customer via the customer device 150. The recommender module 440 may detect, based on the customer metadata, that the particular customer is similar to a particular group of other customers examined by the engine 300 and thus determine that a particular attribute of the input image for the particular customer, e.g. a particular pose of the photo is preferred based on online customer behaviours of other similar customers. The recommender module 440 may determine that a particular customer is similar to the particular group of other customers such as by determining that the customer is part of a group of customers who have historically (based on tracking and retrieving image engagement data) interacted more with images depicting a specific pose for a specific type of product. The recommender module 440, thus provided the recommended pose for the base image of the particular customer (e.g. as may be retrieved via the base image retrieval module 404) to the GAN 418. Specifically, the image of the particular customer along with the desired pose information may be fed to a first GAN 418, the GAN being trained on poses, and thus the respective GAN 418 generates an output image of a model, e.g. the particular customer with that pose—this may be referred to as the base image herein. The engine 300 may then monitor online interactions of the particular customer with the online store in e-commerce site (e.g. browsing history, shopping cart, etc.) and subsequently replace product items in the base image based on the online interaction to generate the output image 428, as previously described via the classifier 408 and the GAN 418. For example, if a product is selected on the merchant off-platform website 104 having an image of "shoes" and if the model in the base image was previously wearing shoes (e.g. as determined by the classifier 408 which performs the object detection) then an input is provided to another GAN 418 of the image of the shoes and the base image so that the GAN 418 would determine to replace the shoes and generate the output image 428 with the updated shoes (e.g. in the second product image).

If a subsequent interaction online, as tracked by the engine 300, indicates that the particular customer has an interest in shirts and an input (e.g. via a UI input 429) is received of a particular shirt (which may be delineated to be just the shirt), the GAN 418 is configured to replace the model's shirt that the model is wearing in the second image (e.g. as provided by the product image retrieval module 402) to generate the output image 428.

In one or more examples, the functions described may be implemented in hardware, software, firmware, or combinations thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including such media as may facilitate transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

Various embodiments have been described. These and other embodiments are within the scope of the following claims.

The invention claimed is:

1. A computer implemented method comprising:
  receiving a first input image depicting a first set of products;
  determining from the first input image, the first set of products and corresponding first product categories;
  receiving, via a user interface of a requestor device, a second input image depicting other products having corresponding second product categories, the second input image selected as being of interest; and,
  matching the first product categories with the second product categories and using one or more generative adversarial networks (GANs) to generate an output image based on one of the first product categories matching the second product categories, the generating including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

2. The method of claim 1, further comprising: providing a classifier for determining based on the first input image, the first set of products and for determining the second product categories for the other products.

3. The method of claim 2, wherein the classifier was trained based on a dataset of images to detect product categories.

4. The method of claim 3, wherein the first input image comprises the first set of products depicted in use on at least one of an object or a person.

5. The method of claim 4 further comprising:
  detecting profile data for a user of the requestor device selecting products of interest;
  accessing a database of mapping of the profile data to a set of visual attributes for the user; and,
  modifying the person depicted in the first input image and thereby the output image based on the set of visual attributes.

6. The method of claim 3, wherein the first or the second input image is selected and received in response to interactions with an e-commerce website, the interactions comprising one or more of:
  browsing an e-commerce product on the e-commerce website;
  selecting an e-commerce product on the e-commerce website for detailed viewing; or
  adding an e-commerce product to an electronic cart of the e-commerce website.

7. The method of claim 6, wherein the second input image is further selected based on a recommender model detecting a browsing history of the interactions on the e-commerce website, the browsing history used by the recommender model to detect additional products of interest based on the recommender model being trained on prior browsing history for a set of requestor devices associated with the additional products of interest.

8. The method of claim 3, wherein the classifier was trained on the dataset of images comprising image features associated with each of the images; one or more labelled product categories for each of the images; and a boundary box visually defined around each of the labelled product categories in each image.

9. The method of claim 3, wherein the classifier is a convolutional neural network classifier.

10. The method of claim 3, wherein the first and the second input images depict one or more e-commerce products, the e-commerce products comprising articles of clothing.

11. The method of claim 3, wherein the GANs are trained, using the second image dataset comprises images showing at least one of: person images or product images showing at least e-commerce products.

12. The method of claim 3, further comprising providing a machine learning model trained using historical product and person image data of actual products and persons, the machine learning model receiving as input the output image and classifying the output image as realistic or not based on the output image of the model exceeding a defined confidence score.

13. The method of claim 3, further comprising: determining a priority generation value for the first product categories and the second product categories, and wherein generating the output image replacing said portion of the first input image with the second input image, the replacement occurring only when the priority generation value of corresponding second product categories exceeds the first product categories.

14. The method of claim 3, wherein the GANs are configured to replace the portion of the first input image with the second input image, only when a resulting combination of products in a potential output image satisfies a matching trigger.

15. The method of claim 1, wherein the first input image is first generated by a generative adversarial network (GAN).

16. The method of claim 15, wherein the generating of the first input image and the generating of the output image are performed by a same generative adversarial network.

17. A non-transitory computer readable medium having instructions tangibly stored thereon configured for generating output images, wherein the instructions, when executed cause a system to:
receive a first input image depicting a first set of products;
determine from the first input image, the first set of products and corresponding first product categories;
receive, via a user interface of a requestor device, a second input image depicting other products having corresponding second product categories, the second input image selected as being of interest; and,
match the first product categories with the second product categories and using one or more generative adversarial networks (GANs) to generate an output image based on one of the first product categories matching the second product categories, the generation including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

18. A computer system for generating output images, the computer system comprising:
a processor in communication with a storage, the processor configured to execute instructions stored on the storage to cause the system to:
receive a first input image depicting a first set of products;
determine from the first input image, the first set of products and corresponding first product categories;
receive, via a user interface of a requestor device, a second input image depicting other products having corresponding second product categories, the second input image selected as being of interest; and,
match the first product categories with the second product categories and using one or more generative adversarial networks (GANs) to generate an output image based on one of the first product categories matching the second product categories, the generation including applying the first input image and the second input image to the one or more GANs trained using image dataset for corresponding ones of the first and second product categories, to generate the output image replacing at least a portion of first input image with the second input image, the replacement based on the matching between one of the first product categories and the second product categories.

19. The system of claim 18, further comprising: a classifier configured for determining on the first input image, the first set of products and for determining the second product categories for the other products.

20. The system of claim 19, wherein the classifier was trained based on a dataset of images to detect product categories and the first input image comprises the first set of products depicted in use on at least one of an object or a person.

* * * * *